United States Patent [19]

Bunyan

[11] 4,281,580

[45] Aug. 4, 1981

[54] TENSIONING DEVICES

[75] Inventor: Thomas W. Bunyan, London, England

[73] Assignee: Pilgrim Engineering Development Ltd., London, England

[21] Appl. No.: 91,661

[22] Filed: Nov. 5, 1979

Related U.S. Application Data

[63] Continuation of Ser. No. 873,828, Jan. 31, 1978, abandoned.

[30] Foreign Application Priority Data

Feb. 2, 1977 [GB] United Kingdom ................ 4284/77

[51] Int. Cl.$^3$ ................ F16B 35/06

[52] U.S. Cl. ................ 411/548; 254/29 A

[58] Field of Search ............ 85/1 T, 32 T; 254/29 A; 100/295; 92/177

[56] References Cited

U.S. PATENT DOCUMENTS

| | | | |
|---|---|---|---|
| 655,685 | 8/1900 | Burley | 92/177 X |
| 2,955,579 | 10/1960 | Block | 92/177 X |
| 3,154,006 | 10/1964 | Novak | 254/29 A |
| 3,285,568 | 11/1966 | Biach | 254/29 A |
| 3,556,465 | 1/1971 | Little | 92/91 X |
| 3,772,759 | 11/1973 | Bunyan | 85/1 T X |
| 4,120,230 | 10/1978 | Bunyan | 85/1 T |

FOREIGN PATENT DOCUMENTS 991783 5/1965 United Kingdom .

*Primary Examiner*—Fraocis K. Zugel
*Attorney, Agent, or Firm*—Woodcock, Washburn, Kurtz, Mackiewicz & Norris

[57] ABSTRACT

A hydraulic nut or washer or bolt head comprises piston means let into the recessed end-face of a body. Means for applying hydraulic pressure to a chamber or chambers behind the body are provided to urge the piston means in a direction which leads out of the end face. The piston means has an overall dimension in a first transverse direction which is less than the least possible overall dimension of an annular piston giving the same piston face area and having an overall dimension in another transverse direction, at right angles to the first, which is less than the least overall major dimension for a pair of opposed circular pistons giving the same piston face area. A sealing member comprising a layer of moulded deformable substantially incompressible material on a former is provided in the chamber to contain the hydraulic fluid.

34 Claims, 14 Drawing Figures

TENSIONING DEVICES

This is a continuation of application Ser. No. 873,828, filed Jan. 31, 1978 now abandoned.

The present invention relates to tensioning devices for tightening bolts, studs and like tension members.

Hydraulic tensioning devices such as hydraulic nuts or hydraulic bolts incorporating an annular piston have been employed hitherto in, for example, the tensioning of bolted flange joints. The annular piston is located in an annular recess in the nut or bolt head and surrounds the bolt extending through the flange. The piston is urged out of the recess and against the flange by hydraulic fluid under pressure applied to the recess so as to tension the bolt. Thereafter, a retaining nut may be screwed down against the flange, or shims in the form of a divided ring may be inserted into the available gap beneath the bolt head or the body of the nut so that the hydraulic pressure may be released.

Hydraulic nuts or hydraulic bolts are necessarily larger than the corresponding ordinary nuts or bolts in order to accommodate the annular piston. As a result of this larger size, it is not always possible to achieve such close pitching as is desirable to ensure substantially uniform compression of the flange faces.

Previous attempts at overcoming this disadvantage in hydraulic tensioning devices have included the provision of a separate bridging device. This device is connected at its mid point by means of an adaptor to a conventional bolt and has bridge supports which are positioned over adjacent bolts to either side using spacer caps. Hydraulic fluid is supplied to two hydraulic cylinders within the bridge supports, and the load which is transferred by the pistons to the adjacent bolts creates an upward force causing a tensile strain in the bolt being tensioned. In order to ensure efficient transmission of the forces involved without flexing of the bridge, the device has to be of massive and relatively cumbersome construction.

According to the present invention there is provided a tensioning device comprising a body having piston means housed in a recessed end face of the body and movable parallel to the axis of a shank extending from the body or of a bore extending through the body, and means for supplying hydraulic fluid behind the piston means to urge the piston means in an axial direction which leads out through the said end-face, the piston means having an overall dimension in a first direction transverse of the axis, which is less than the least possible overall diameter of an annular piston giving the same piston face area, and having an overall dimension in another direction transverse to the said axis and normal to the said one direction less than the least overall major dimension for a pair of opposed circular pistons giving the same piston face area, and having two separate or joined face areas on opposite sides of a plane of the body through the said axis and parallel to the said one direction which have centroids collinear with the said axis and spaced from the said axis on either side thereof by respective distances which are inversely proportional to their respective areas.

With this arrangement, the hydraulic tensioning device may be of less overall width than a comparable device having an annular piston of the same piston face area, and yet may be, for example, in the form of a bolt, threaded nut, or an unthreaded washer-like structure. Furthermore, such a device will experience lower internal bending moments than arise from the use of a pair of opposed circular pistons and therefore will not need to be as substantial and cumbersome.

Devices embodying the present invention can have various shapes of piston means, subject to the aforemention constraints on the overall dimensions of the piston means and on the disposition of the centroids of the piston face areas. The piston means can be two pistons in the two regions of the recessed end-face which are on opposite sides of the transverse plane of the body, or it can be a single piston extending across both such regions. Of these two alternatives, the former is preferred since the minimum overall width of the device then need by dictated only by the diameter of the shank or bore. Additionally, two pistons do not require a thin connecting section extending between the two regions of the end-face, which section is necessarily a feature of the latter and can sometimes be prone to deflection or yielding at extreme hydraulic pressures.

Where the centroids of the two faces are at the same distance from the axis, the two separate or joined parts of the piston means to either side of the body's said plane will preferably have the same shape and will preferably by symmetric one to the other with respect to the transverse plane. Piston means lacking such symmetry can be used, and typically will not then have centroids equispaced from the axis. An example of this latter construction might be in a device for compression of an annular flange of sharp curvature, when radial abutment of adjacent devices would be possible with efficient utilisation of the area of the end-face available for housing the piston means.

It is desirable to minimise bending moments within the device and arrange for the piston means to be as close as possible to the axis of the shank or bore. Thus, it is preferred that the piston or pistons curve round the axis so as to have a concave side-face adjacent the axis. The arc described by the concave side face will usually be an arc of a circle centred on the axis and of radius just greater than that of the shank or bore, though other curves can be adapted. Where a single piston is used, it can extend completely round the axis so as to have a cylindrical side-face.

There is one shape for the piston means which we presently particularly prefer. It involves two like pistons each with a crescent of "kidney-shaped" piston face. A suitable kidney-shape can be generated by drawing a minor arc of a circle, drawing a second, major, intersecting arc centred at the bisection of the first arc, and thereafter rounding off the points of intersection. The radius of the first arc will usually be just greater than that of the shank or bore, as discussed in the preceding paragraph, and the radius of the second arc will be about the same or greater. It will be understood that the centre of the second arc can be displaced along the line of bissection, and that other than circular arcs can be used.

The means for supplying hydraulic fluid to behind the piston means can be conventional. Such means can comprise a feed bore extending through the body of a device into a chamber behind each piston of the piston means and within the recessed end-face. With suitable sealing means to prevent leakage of fluid from the chamber, fluid can be fed in at high pressure. In a preferred arrangement an expandable sealing member occupies the or each chamber and a tube, sometimes in the form of a hollow needle, extends from the feed bore into the sealing member. Hydraulic fluid is fed into each sealing member to cause it to expand. Lateral expansion is constrained by the side walls of the chamber, and hence axial expansion occurs to urge the piston means outwardly of the body of the device.

A preferred form of expandable sealing member comprises a layer of rubber or like resilient deformable incompressible material moulded around and enveloping a former. Hydraulic fluid can readily be injected into the member, e.g. via a stem connection fitted to the former, and lifts the resilient layer from the former to expand the sealing member. If desired, channels can be provided in the surface of the former within the sealing member in order to facilitate distribution of injected hydraulic fluid and help ensure even expansion of the resilient layer. To this end, the channels are filled with salt or other sacrificial material prior to moulding on of the resilient layer. After moulding, a suitable solvent (water for salt) can be injected to dissolve the sacrificial material and thereafter the solution formed is withdrawn. In a preferred embodiment, the expandable sealing member has a nitrile rubber layer moulded around a metal former, preferably an aluminum former.

It is expected that expandable sealing members of the kind described in the last paragraph can be used with other tensioning devices for example with tensioning devices with annular pistons of circular outline in plan, in addition to those which embody the invention in accordance with the preceding definition. In view o this expectation, the present invention further provides in a second aspect a tensioning device comprising a body having one or more pistons housed in a recessed end-face of the body and movable parallel to the axis of a shank extending from the body or of a bore extending through the body, an expandable sealing member in the recess behind each piston and comprising a layer of rubber or like resilient deformable incompressible material moulded around and enveloping a former, and means for supplying hydraulic fluid into the or each member to cause its resilient layer to expand and thereby to urge the or each piston in a direction which leads out through the said end-face.

Supply of hydraulic fluid into the or each sealing member e.g. by stem connections, results in expansion of the resilient layer away from the former. Substantial lateral expansion is prevented by the side walls of the recess, and the axial expansion thus ensues with the result that the or each piston is urged outwardly of the end-face.

As a corollary to the foregoing, the present invention also provides a method of making an expandable sealing member for tensioning devices as previously defined, the method comprising moulding a layer of rubber or like resilient deformable incompressible material around a former. The invention also embraces the product of this method.

An expandable sealing member comprising a resilient layer moulded around a metal former is easier to make than most of the expandable sealing members which have been previously in hydraulic tensioning devices. Hitherto with annular pistons a hollow, annular rubber expandable sealing member has been employed, but some difficulty has been encountered in forming the continuous passage in such members. Such difficulties are avoided with the expandable sealing members provided in accordance with the second aspect of the invention since the rubber is moulded around the former and the former remains inside the sealing member in use. Hydraulic fluid injected into sealing member enters between the former and the inside of the sealing member to expand the sealing member away from the former. Furthermore, injection or hydraulic fluid into the present expandable sealing member soon fills any distribution channels and immediately thereafter expansion ensures. This is to be contrasted with the conventional expandable sealing members where the continuous passage represents a substantial dead-space which has to be filled with hydraulic fluid before expansion occurs. Since the high pressure pumps usually employed for injecting hydraulic fluid are of low capacity, this saving in dead-space represents a considerable saving in the time needed to tension the hydraulic tensioning device.

The present invention will now be described further by way of example with reference to the accompanying drawings, in which.

Figure 4A:
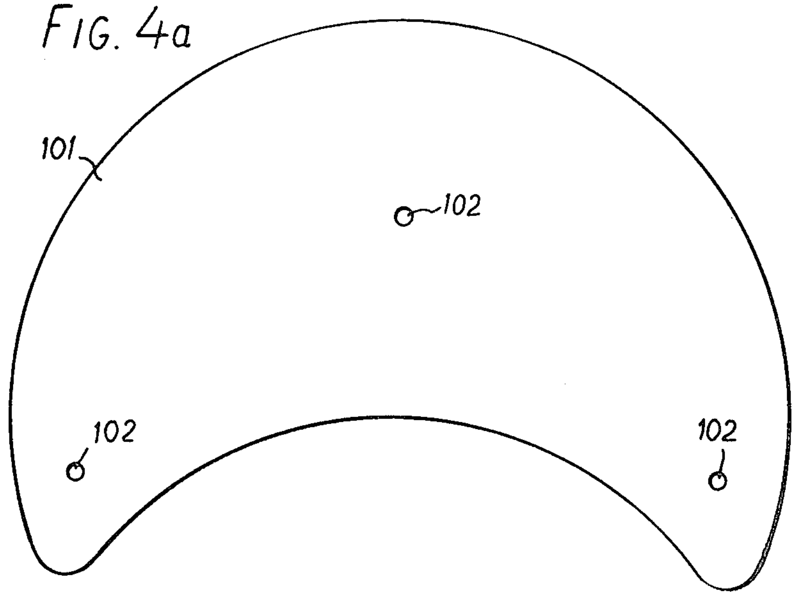
Figure 4B:
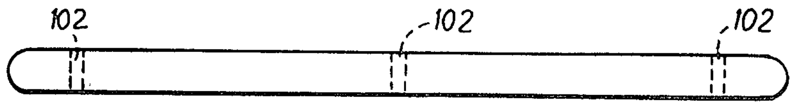
Figure 5:
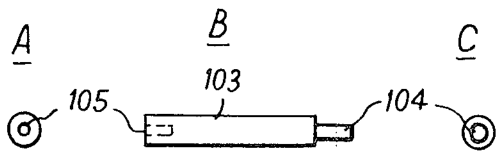
Figure 6:
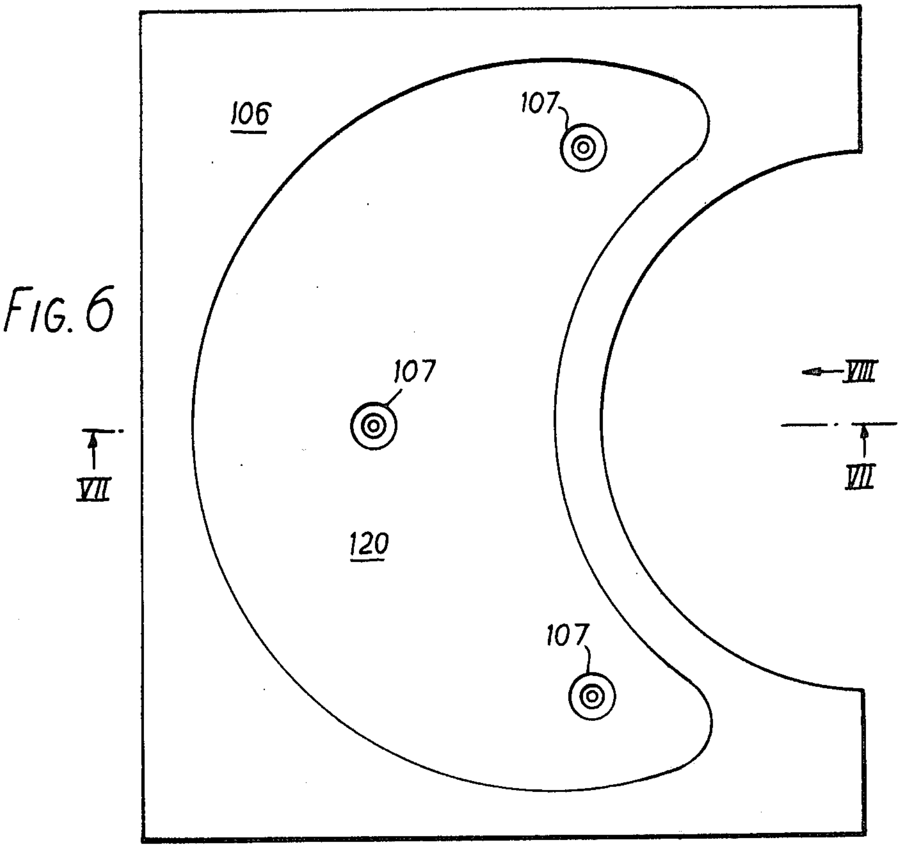
Figure 7:
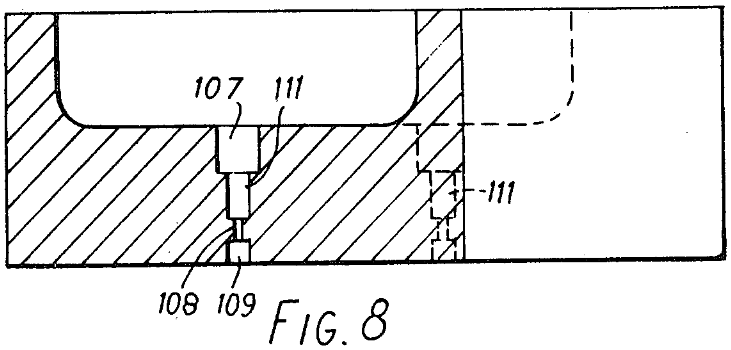
Figure 8:
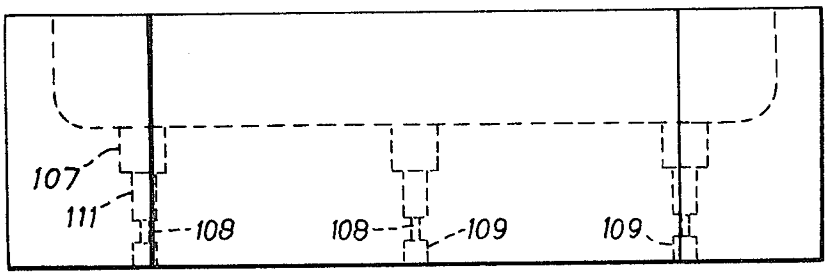
Figure 9:
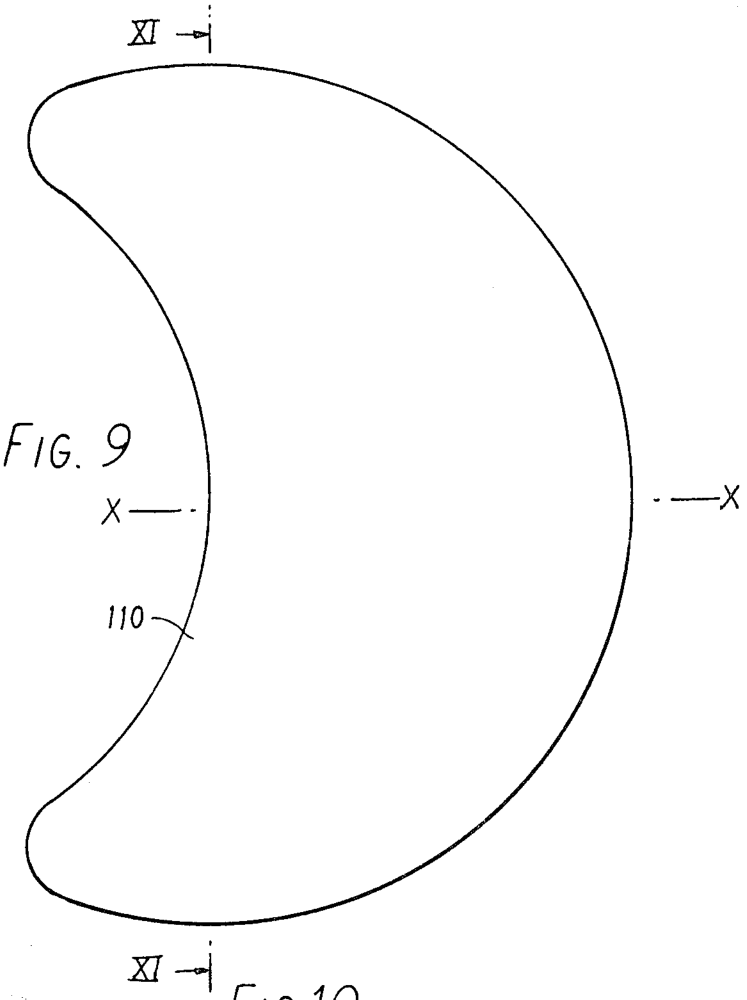
Figure 10:
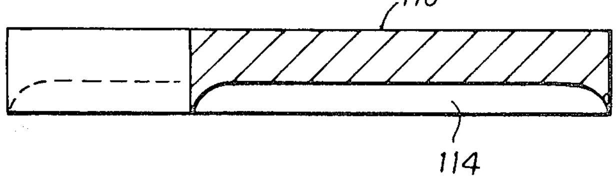
Figure 11:
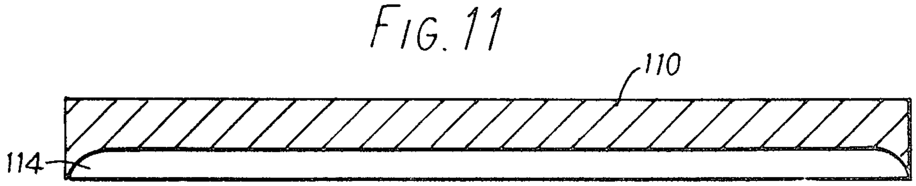

FIGS. 4*a* and *b* show plan and side views of a former;

FIGS. 5A, B, and C show end, side and opposite end views of a former fixing pin;

FIG. 6 shows a plan view of a mould;

FIG. 7 shows a section on the line VII—VII of FIG. 6;

FIG. 8 shows a section on the line VIII—VIII of FIG. 6;

FIG. 9 shows a plan view of a piston; FIG. 10 shows a section on the line X—X; and FIG. 11 shows a section on the line XI—XI.

Figure 1:
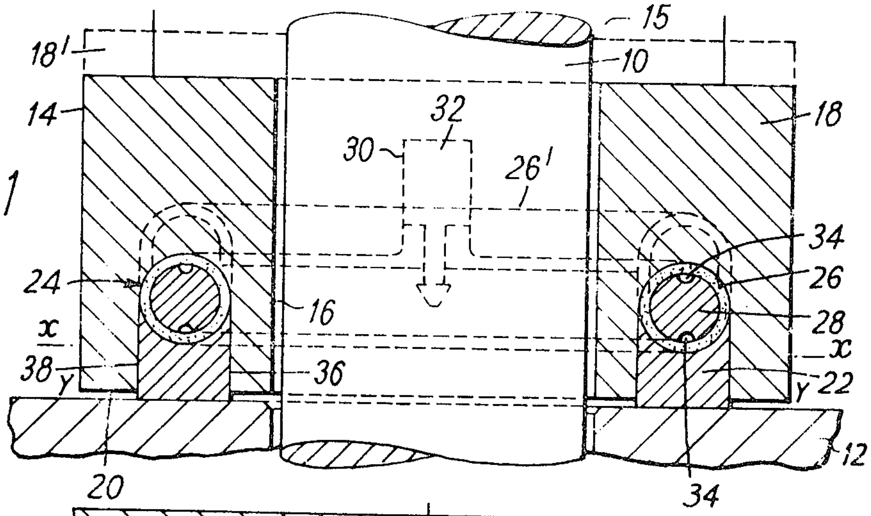
FIG. 1 is a vertical cross-section of a flange bolt with a hydraulic washer-like device which embodies the present invention.
Figure 2:
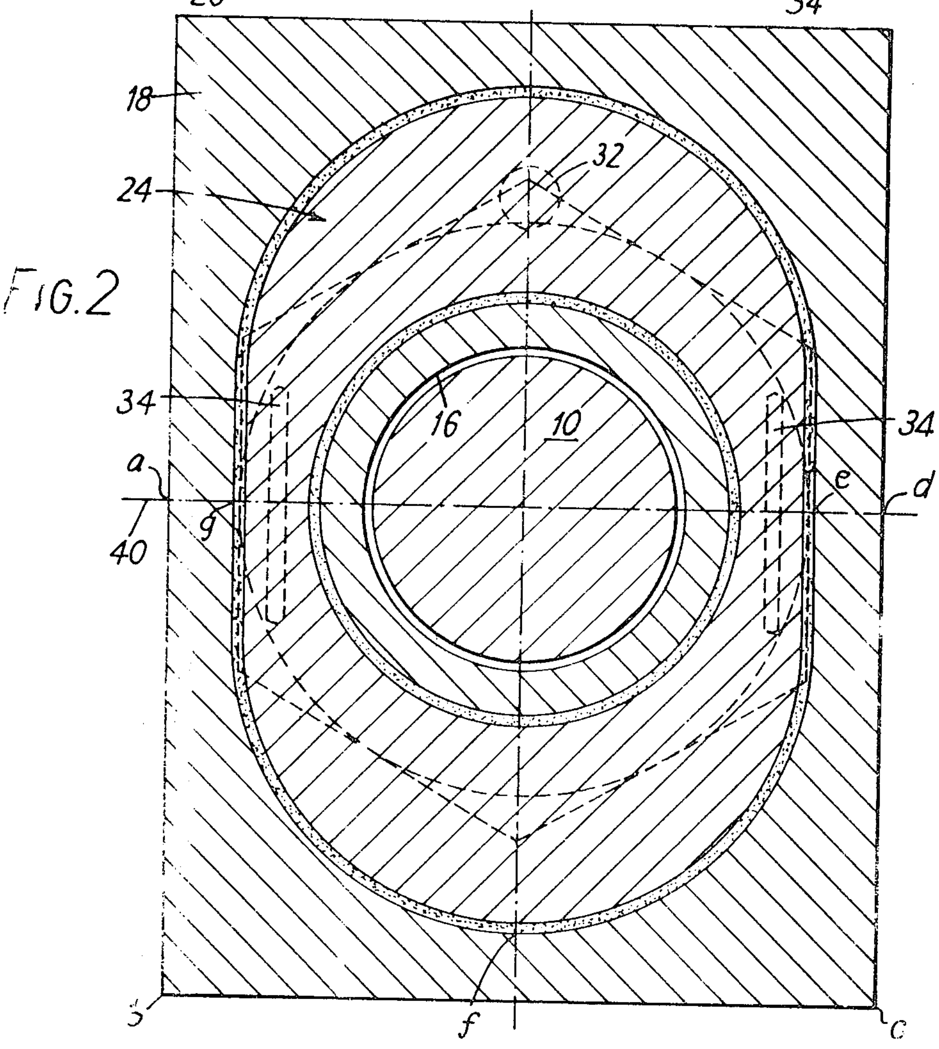
FIG. 2 is a horizontal cross-section of the bolt and hydrulic device of FIG. 1, as indicated by the line II—II in FIG. 1.

Referring first to FIGS. 1 and 2, a bolt 10 extends through a flange 12 and is being tensioned by a hydraulic washer-like device 14 embodying the present invention and retained on the bolt by a nut 15. The hydraulic device 14 has a smooth central bore 16 for the bolt and comprises an oblong body 18 of high tensile steel having a recessed end-face 20 which houses piston means 22 in the form of a single piston surrounding the bolt 10. The recess in the end-face 20 is dimensioned such that the piston means 22 is movable parallel to the axis of the bore 16.

As can be seen in FIG. 1, an expandable sealing member 24 occupies a chamber within the recessed end-face 20 and behind the rear face of the piston means 22. This sealing member 24 comprises a layer 26 of nitrile rubber moulded on to a metal former 28 conveniently of aluminum. A bore 30 extends through the oblong body 18 and houses a stem connection 32 for supplying hydraulic fluid into the expandable sealing member 24 to urge the piston means 22 in a direction which leads out through the said recessed end-face.

In order to facilitate distribution of hydraulic fluid within the sealing member 24, hollow channels 34 are provided. Such hollow channels are formed in the sealing member during moulding by the use of sacrificial cores of soluble material such as common salt. During the manufacture of the sealing member the channels are filled with salt before the resilient layer 26 is moulded on. Thereafter water is injected to dissolve the salt and the solution thus formed is withdrawn.

The shape of the piston means 22 will be apparent from FIGS. 1 and 2; the horizontal cross-section is the same as for the sealing member 24. The piston means 20 has a circular-cylindrical inner side-face 36 of radius just greater than that of the bore 16 and an extended outer side-face 38. The outer side-face 38 is dimensioned such that the piston means 22 has an overall transverse dimension less than the least possible overall diameter of an annular piston giving the same piston face area, and an overall longitudinal dimension less than the least possible for a pair of opposed circular pistons giving the same piston face area. Furthermore, the two piston face areas of the piston means on either side of the body's transverse plane 40 have centroids collinear with the axis of the bore 16 and equispaced therefrom.

In use, hydraulic fluid will be supplied via a manifold to a series of like tensioning devices arranged similarly to the hydraulic device 14. As this is done, the fluid will cause the resilient layer 26 to expand and tend to force the piston means 22 out of the recessed end-face 20. The load transferred by the piston means 22 to the face of the flange 12 creates an upward force acting against the nut 15, which in turn will cause a tensile strain in the bolt 10. With increasing fluid pressure so the tensile strain will increase, until at say 30,000 psi the resilient layer 26 has expanded to the relative position 26' shown by chain lines in FIG. 1. The body 18 will then have moved to the relative position 18' with the result that the end-face 20 is at X—X instead of y—y. Thereupon a pair of split shims can be inserted into the available gap and the fluid pressure released. Preferably the shims are split by the transverse plane 40 of the body, each having a profile subtended by the points a to g, and are of thickness xy.

As an alternative to inserting shims, a working nut (not shown) can be screwed down against the flange by an amount equal to gap xy. Thereafter the fluid pressure can be released and the straining nut and the hydraulic device 14 removed.

Figure 3:
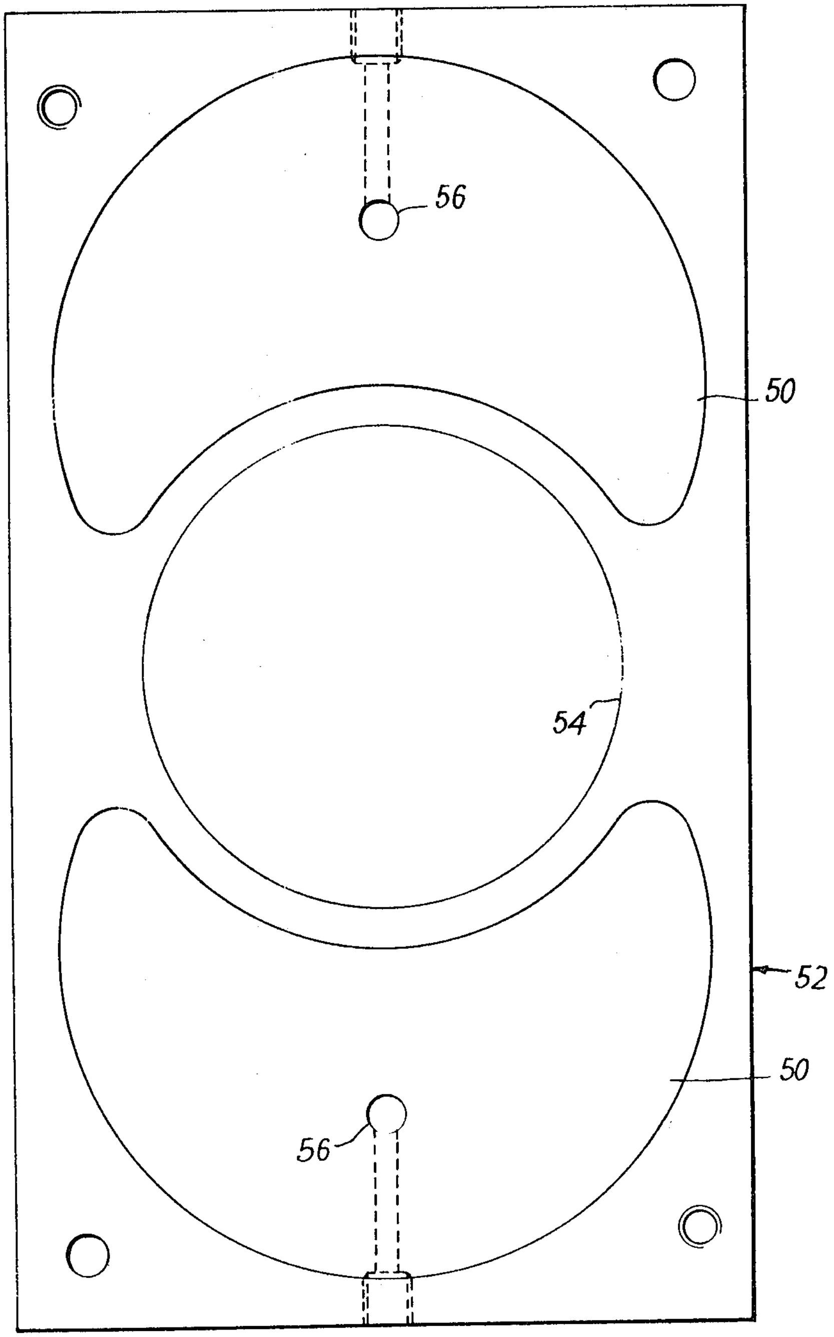
FIG. 3 is a horizontal cross-section similar to FIG. 2 of an alternative hydrualic device embodying the present invention.

The second embodiment shown in FIG. 3 is much the same as that described above except that the piston means comprises two separate pistons each with a kidney-shaped piston face. The faces are the same configuration as the horizontal cross-section through the respective expandable sealing members 50 shown in FIG. 3. Once again the tensioning device exemplified is a hydraulic washer-like device 52 with a central bore 54 for a bolt. Separate feed-bores with stem connections 56 are provided for supplying hydraulic fluid into the two sealing members, though a manifold or other arrangement is used to ensure that fluid at the same pressure is supplied to both. Operation of the device is otherwise the same as that for the device of FIGS. 1 and 2, and shims or a working nut can be used to take up the gap obtained by use of the device.

Both the two hydraulic devices described above have the advantage that the body is less wide than a comparable conventional device with an annular piston, which thereby makes possible the simultaneous tensioning of adjacent bolts pitched close together. Furthermore, bending moments within the devices are minimised using either of the piston means illustrated. Compared with the design shown in FIGS. 1 and 2, that of FIG. 3 has the further advantage of having piston means with no relatively thin sections which might be subject at extreme pressures to slight flexing or bending.

The procedure for manufacturing the sealing member will now be described with reference to FIGS. 4 to 11.

An aluminum former 101 of thickness ⅜" is drilled and tapped in three positions as shown at 102 on FIGS. **4*a* and 4*b*. Into these holes are fitted three former fixing pins 103 see FIGS. 5A, B, and C made from mild steel bar, externally threaded at one end 104 to screw into the former 101 and internally drilled and tapped for example 8BA at the other end 105. The former fixing pin 103** is of sufficient length to give the required thickness of the upper and lower face of the nitrile rubber tyre.

The mould 106 is shown in FIG. 6 having a cavity 120 with three teat holes 107 at the bottom of it, each teat hole first reducing to a hole 111 small enough in diameter to support the former fixing pin. This further reduces to a diameter to accommodate the shank of an 8BA bolt at 108 and the increases to accommodate the head of the same 8BA bolt at 109.

Two sheets of uncured nitrile rubber of a shore hardness of 60 and a thickness of 3/16" are cut to shape to be slightly oversize of the mould cavity 120 and are then degreased. One sheet is laid into the bottom of the mould which has also been degreased.

The aluminum former 101 with the fixing pins 103 now fitted is presented to the mould 106 the pins being passed through the bottom layer of nitrile rubber and locating it in the teat holes 107 where the assembly is made secure in the mould by the use of the 8BA bolts.

It is then seen that the former fixing pins mount the former very securely in the mould thus giving the uniform wall thickness of the completed cured tyre.

A strip of the correct length of the same uncured nitrile rubber of width say ⅜" is degreased and placed around the sides of the mould between the mould and the sides of the aluminum former and on top of the bottom layer of rubber.

The second sheet of nitrile rubber cut to size is placed on top of the former and kneaded on to the side walls methodically in order to exclude any air which may be trapped in the uncured assembly.

A piston 110 (FIGS. 9 to 11) with a recess 114 on its underside is placed on top of the assembly and a thick flat plate is placed over the whole assembly to provide uniform heat distribution and also to alleviate any unevenness of the plattens of the hydraulic press used for the curing process.

After curing, the tyre assembly is removed from the mould and allowed to cool. When cool, one former fixing pin 103 can be removed and the type can be tested using a standard workshop airline at 100 psi. As the tyre is unconstrained in this test, it will be subjected to far greater strains than will ever be incurred in practice. Immersion of the inflated tyre in water will determine any leakage. The pressure can now be released and the two remaining former fixing pins can be removed. X-ray examination of the tyre can be used to indicate a constant wall thickness.

Note that the aluminum former remains in the tyre throughout its use. In use, the holes of the two unused teats in the tyres are blanked off using mild steep probe fittings which can be interference fitted into the teats or fitted using Araldite as required.

Perhaps the main advantage of using these former fixing pins for holding the former apart from the obvious one of the former not moving during the curing process, is that in use on the tensioner the holes drilled in the former allow the fluid which is inlet on one side of the tyre to rapidly transfer through to the other side thus enabling uniform inflation of the tyre during the application of the pressure cycle, and similarly and perhaps more important on removal of the pressure, the fluid returns to the hydraulic reservoir (i.e. pump) uniformly thus enabling the load cell assembly and, in this case tensioning device, to return to its initial position quickly and uniformly.

While the present invention has been described in detail with reference to embodiments which have an unthreaded bore, other forms are possible. Thus, for example, the tensioning device provided could be in the form of a hydraulic bolt, with the piston means in an end-face form which projects the shank of the bolt. Likewise, a more conventional form of sealing member can be employed.

It will also be appreciated that while the expandable sealing members employed have been described in the context of particular tensioning devices, the use of such a member comprising a resilient layer on a metal former should find wider applicability. One example would be in devices more akin to the known hydraulic nuts and hydraulic bolts, and employing a single annular piston.

I claim:

1. A tensioning device comprising a body having piston means housed in a recessed end-face of the body and movable parallel to an axle extending through the body, and means for supplying hydraulic fluid behind the piston means to urge the piston means in an axial direction which leads out through said end-face, said piston means having two piston face areas, one on each of a transverse plane of the body containing said axis, said piston and face areas of said piston means having a concavely curved inner side-face with respect to said axis and an extended convexly curved outer side-face, the outer side-face being dimensioned such that the piston means has an overall transverse dimension less than the least possible overall diameter of an annular piston giving the same piston face area, and an overall longitudinal dimension less than the least possible for a pair of opposed circular pistons giving the same piston face area, said two piston face areas of said piston means having centroids collinear with said axis of the body, the centroids being spaced from said axis by respective distances which are inversely proportional to the areas of the respective pistons face areas.

2. A tensioning device according to claim 1 in which the body is a bolt head having a shank extending from the bolt head in the same direction as the piston.

3. A tensioning device according to claim 1 in which the body is a washer with a cylindrical bore extending through it parallel to its axis.

4. A tensioning device according to claim 1 in which the body is a nut with a screw-thread bore extending through it parallel to its axis.

5. A tensioning device according to claim 1 in which the piston means comprises two pistons in the two regions of the recessed end face which are on opposite sides of the said plane of the body.

6. A tensioning device according to claim 5 in which the pistons have a kidney-shaped or crescent-shaped piston face.

7. A tensioning device according to claim 1 in which the piston means comprise a single piston extending across both regions of the recessed end face, the radial width of the piston end face being relatively large along the radii lying in said other direction and being relatively narrow along the radii lying in the said other direction.

8. A tensioning device according to claim 7 in which the piston means are symmetrical about the said plane of the body.

9. A tensioning device according to claim 8 in which the piston means curve round the axis so as to have a concave side-face adjacent the axis.

10. A tensioning device according to claim 9 in which the arc described in the concave side face is the arc of a circle.

11. A tensioning device according to claim 10 in which the arc described is the arc of a circle centered on the axis and having a radius just greater than that of the shank or bore.

12. A tensioning device according to claim 11 in which the arc extends completely around the axis to form a cylindrical side-face.

13. A tensioning device according to claim 1 in which the means for supplying hydraulic fluid comprises a feed bore extending through the body of the device into an expandable sealing member in a chamber behind the piston of the piston means.

14. A tensioning device according to claim 13 in which the sealing member comprises a layer of ruber-like resilient deformable incompressible material moulded around and enveloping a former so arrayed that hydraulic fluid can be injected into the member to lift the resilient layer from the former and expand the sealing member.

15. A tensioning device according to claim 14 in which distribution channels are provided in the surface of the former.

16. A tensioning device according to claim 13 in which the former is of metal.

17. A tensioning device according to claim 16 in which the metal includes aluminum.

18. A tensioning device comprising a body having piston means housed in a recessed end-face of the body and movable parallel to an axis extending through the body, and means for supplying hydraulic fluid behind the piston means to urge the piston means in an axial direction which leads out through said end-face, said piston means having two piston face areas, one on each side of a transverse plane of the body containing said axis, said piston and face areas of said piston means having a curved substantially circular inner side-face with respect to said axis and an extended curve substantially oval-shaped outer side-face, the outer side-face being dimensioned such that the piston means has an overall transverse dimension less than the least possible overall diameter of an annular piston giving the same piston face area, and an overall longitudinal dimension less than the least possible for a pair of opposed circular pistons giving the same piston face area, said two piston face areas of said piston means having centroids collinear with said axis of the body, the centroids being spaced from said axis by respective distances which are inversely proportional to the areas of the respective pistons face areas.

19. A tensioning device according to claim 18 in which the body is a bolt head having a shank extending from the bolt head in the same direction as the piston.

20. A tensioning device according to claim 18 in which the body is a washer with a cylindrical bore extending through it parallel to its axis.

21. A tensioning device according to claim 18 in which the body is a nut with a screw-thread bore extending through it parallel to its axis.

22. A tensioning device according to claim 18 in which the piston means comprises two pistons in the two regions of the recessed end face which are on opposite sides of the said plane of the body.

23. A tensioning device according to claim 22 in which the pistons have a kidney-shaped or crescent-shaped piston face.

24. A tensioning device according to claim 18 in which the piston means comprise a single piston extending across both regions of the recessed end face, the radial width of the piston end face being relatively large along the radii lying in the longitudinal direction and being relatively narrow along the radii lying in the transverse direction.

25. A tensioning device according to claim 24 in which the piston means are symmetrical about the said plane of the body.

26. A tensioning device according to claim 25 in which the piston means curve round the axis so as to have a concave side-face adjacent the axis.

27. A tensioning device according to claim 26 in which the arc described in the concave side-face is the arc of a circle.

28. A tensioning device according to claim 27 in which the arc described is the arc of a circle centered on the axis and having a radius just greater than that of the shank or bore.

29. A tensioning device according to claim 28 in which the arc extends completely around the axis to form a cylindrical side-face.

30. A tensioning device according to claim 18 in which the means for supplying hydraulic fluid comprises a feed bore extending through the body of the device into an expandable sealing member in a chamber behind the piston of the piston means.

31. A tensioning device according to claim 30 in which the sealing member comprises a layer of rubber-like resilient deformable incompressible material molded around and enveloping a former so arrayed that hydraulic fluid can be injected into the member to lift the resilient layer from the former and expand the sealing member.

32. A tensioning device according to claim 31 in which distribution channels are provided in the surface of the former.

33. A tensioning device according to claim 30 in which the former is of metal.

34. A tensioning device according to claim 33 in which the metal includes aluminum.

* * * * *